July 6, 1937. P. BRÜHL 2,086,466
TWO-ROW BALL BEARING
Filed June 22, 1936
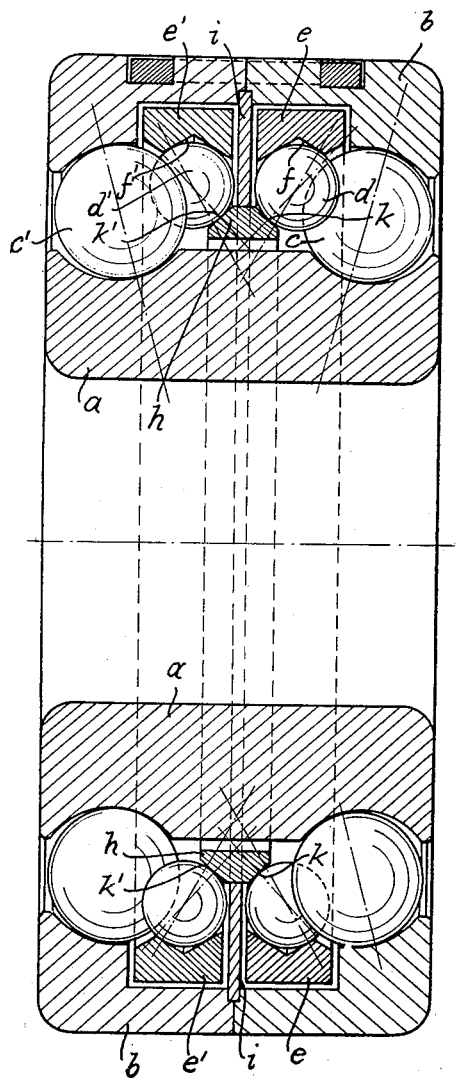
P. Brühl
INVENTOR
By: Glascock Downing & Seebold
Attys.

Patented July 6, 1937

2,086,466

UNITED STATES PATENT OFFICE 2,086,466

TWO-ROW BALL BEARING

Paul Brühl, Berlin-Charlottenburg, Germany; Margarete Bruhl, née Dommick, sole heir of the estate of said Paul Brühl, deceased Application June 22, 1936, Serial No. 86,681
In Germany June 27, 1935

5 Claims. (Cl. 308—200)

Two-row ball bearings having a row of separating balls, which are disposed between the two series of supporting balls and are surrounded by a guide ring which, for centering purposes, extends with lateral shoulders almost up to the supporting balls, have already been proposed in themselves.

In double-row ball bearings of this nature it may occur that, owing to a not quite perfectly uniform diameter of the race, the two sets of supporting balls or, due to a certain if only very slight oval form of the race, which also results in varying diameters thereof, the single supporting balls of the same set, tend to run at different speeds. This is prevented by the coupling of the two sets of supporting balls by the series of separating balls. This in turn causes certain of the supporting balls to be forced outwards, and in consequence there is a sliding movement of the shoulders on the guide ring for the separating balls against the supporting balls. Moreover in the known ball bearings of the double-row type the position of the guide ring with the separating balls is an unstable one, so that in itself, when the bearing revolves, these parts will frequently assume an eccentric position until parts of the shoulders on the guide ring bear against the supporting balls, which will also result in a sliding friction between the shoulders of the guide ring and the supporting balls, inasmuch as the radial pressures exerted on the separating balls result in components which increase the pressure of the shoulders. An increase in the pressure of the shoulders of the guide ring against the supporting balls will occur quite particularly if the ball bearing is subjected to axial pressures which somewhat vary the angle at which the supporting balls are brought to bear in their races.

The sliding friction between the shoulders of the guide ring and the supporting balls and the coupling of the two sets of supporting balls by the one series of separating balls accordingly results in the fact that, since the movements of the sets of supporting balls are thus affected, there is also a certain if only comparatively slight sliding movement of the supporting balls against their races.

It is accordingly the object of the invention to provide a ball bearing of the double-row type having separating balls between the two sets of supporting balls, in which the sliding friction occurring in the known bearings is reduced or even eliminated entirely.

This is accomplished in accordance with the invention by providing for each set of supporting balls a separate series of separating balls, the balls of which are disposed between each two balls of the appertaining supporting set, so that between the two series of supporting balls there are two spaced sets of separating balls, which are surrounded by a guide ring centered with its shoulders on the supporting balls or in the outer race.

If in a ball bearing constructed in this fashion the two sets of supporting balls have the tendency to run at different speeds, they are not prevented from doing this by the separating balls, as a separate series of separating balls is provided for each set of supporting balls. Under certain circumstances, therefore, there will merely be a sliding movement of the separating balls against the guide ring when, for example, the two sets of separating balls, owing to the different speeds of the supporting sets, will also run at different speeds.

Since the pressure of the separating balls against the guide ring is merely very slight the sliding friction possibly occurring between the separating balls and the guide ring will also be very small, and a ball bearing of the double-row type is, if only for this reason alone, a considerable improvement on the known double-row type of ball bearing having one set of separating balls between the two sets of supporting balls, the sliding friction of the supporting balls against their races being eliminated or reduced and also the pressure of the shoulders against the supporting balls being smaller, since the balls of the two supporting sets perform movements in relation to one another.

An additional improvement as regards the double-row type of ball bearing is accomplished by dividing at the center between the two sets of supporting balls the guide ring common to the two sets of separating balls, so that each set of separating balls then possesses its own guide ring and the friction between the separating balls and the guide ring is accordingly also eliminated.

To obtain complete elimination of the friction between the shoulders on the two halves of the supporting ring and the supporting balls the double-row ball bearing, in accordance with the invention, is so constructed that for centering the two halves of the guide ring for the two sets of separating balls there is arranged within the two separating sets, i. e., between the two supporting sets, a roll ring, against the correspondingly bevelled side faces of which there bear the separating balls at points disposed approximately diametrically to their bearing points against the halves of the guide ring, and which is supported centrally in relation to the outer race of the bearing by means of a supporting ring which extends between the two halves of the guide ring.

In a ball bearing of this nature, in which the centering of the two guide rings or the two halves of the guide ring is effected with the aid of the roll ring, the guide rings at no time bear against the supporting balls, and accordingly in this bearing a sliding friction can only occur substantially between the roll ring and the supporting ring, which friction can also be still further reduced by making the supporting ring wholly or at least on its inner peripheral face bearing against the roll ring of a material which possesses a low sliding resistance in relation to the steel constituting the material of the roll ring, for example of a suitable bronze.

In accordance with the most advantageous form of embodiment of a double-row ball bearing according to the invention the friction between the roll ring and the supporting ring may be completely or for all practical purposes completely overcome by selecting or disposing the points of contact between the roll ring and the separating balls in such fashion that the bearing points of the separating balls against the roll ring upon the movement of the separating balls in the bearing have a speed which is completely or at least approximately nil, the separating balls accordingly rolling over the roll ring, so that the roll ring is perfectly stationary, or practically so, and the supporting ring is merely required in the main to effect centering of the roll ring without any appreciable degree of friction being able to occur between the roll ring and the supporting ring.

A ball bearing constructed on these lines accordingly exhibits practically only rolling friction, which is very desirable.

The drawing shows a section through a form of embodiment of a ball bearing according to the invention.

In the embodiment of the ball bearing according to the invention there is provided within the two sets of separating balls $d$, $d'$ a roll ring $h$ having bevelled lateral faces, against which there bear the separating balls $d$, $d'$. The roll ring $h$ thrusts by means of the supporting ring $i$ against the outer race $b$, and the supporting ring $i$ extends between the two halves $e$, $e'$ of the guide ring.

The supporting ring $i$ may be composed either entirely or merely along its inner peripheral face of a material, which exhibits a low sliding resistance as compared with the roll ring composed of steel. The supporting ring $i$ may accordingly be made with advantage of a suitable bronze. The bearing points $k$, $k'$ of the separating balls $d$, $d'$ against the roll ring $h$ are so selected that upon the revolution of the bearing the separating balls $d$, $d'$ roll over the roll ring $h$, so that the latter is wholly or practically wholly stationary and accordingly no movement takes place between the roll ring $h$ and the supporting ring $i$.

A ball bearing according to that shown may be so developed in its construction that the roll ring $h$ is also separated at its center, so that there is a separate roll ring for each set of separating balls, the independence of the movements of the two sets of separating balls thus being additionally increased.

It will be understood that no limitation is made to the specific form of embodiment illustrated in the drawing, and that numerous modifications are quite possible within the meaning of the invention as defined in the above description and the annexed claims.

What I claim as new and desire to secure by Letters Patent is:

1. In a ball bearing, inner and outer races, two sets of supporting balls, two spaced sets of separating balls intermediate of the said first sets, and a guide ring surrounding the said sets of separating balls in common to both sets, the said guide ring being divided along the center between the two rows of supporting balls to provide a separate guide for each set of separating balls.

2. In a ball bearing, inner and outer races, two sets of supporting balls, two spaced sets of separating balls intermediate of the said first sets, a divided guide ring surrounding the said sets of separating balls, a roll ring disposed within the said separating sets between the said sets of supporting balls, bevelled lateral faces to the said roll ring, the said separating balls bearing against the said bevelled faces at points disposed diametrically to the points at which the said separating balls bear against the guide ring, and a supporting ring supporting the said roll ring centrally against the outer race of the bearing, the said supporting ring extending between the sections of the said divided guide ring.

3. In a ball bearing, inner and outer races, two sets of supporting balls, two spaced sets of separating balls intermediate of the said first sets, a guide ring surrounding the said sets of separating balls, a roll ring disposed within the said separating sets between the said sets of supporting balls, bevelled lateral faces to the said roll ring against which there bear the said separating balls, and a supporting ring supporting the said roll ring centrally against the outer race of the bearing, the inner face of the said supporting ring being composed of a material having a low sliding resistance as compared with the material of the said roll ring.

4. In a ball bearing, inner and outer races, two sets of supporting balls, two spaced sets of separating balls intermediate of the said first sets, a guide ring surrounding the said sets of separating balls, a roll ring disposed within the said separating sets between the said sets of supporting balls, bevelled lateral faces to the said roll ring against which there bear the said separating balls, and a supporting ring supporting the said roll ring centrally against the outer race of the bearing, the points of contact between the said roll ring and the said separating balls being such that the bearing points of the separating balls against the roll ring upon the movement of the said balls is approximately equal to nil, the separating balls rolling over the said roll ring, so that the roll ring is practically stationary and the supporting ring effects primarily the centering of the roll ring.

5. In a ball bearing, inner and outer races, two sets of supporting balls, two spaced sets of separating balls intermediate of the said first sets, a divided guide ring surrounding the said sets of separating balls, a roll disposed within the said separating sets and divided along the center to form a separate roll ring for each set of separating balls, and a supporting ring supporting the said roll ring centrally against the outer race of the bearing.

PAUL BRÜHL.